United States Patent

Carlsson et al.

[15] 3,659,050

[45] Apr. 25, 1972

[54] COMBINED LOUD- AND LOW-SPEAKING TELEPHONE INSTRUMENT HAVING TWO ACOUSTIC CONVERTERS

[72] Inventors: Anders Kjell Johan Carlsson, Vendelso; Anders Ossian Jorgensen, Bromma; Olof Alarik Olsson, Bandhagen; Horst Robert Adolf Ziegler, Johanneshov, all of Sweden

[73] Assignee: Telefonaktiebolaget LM Ericsson, Stockholm, Sweden

[22] Filed: Oct. 22, 1970

[21] Appl. No.: 83,109

[30] Foreign Application Priority Data

Oct. 30, 1969 Sweden....................14838/69

[52] U.S. Cl.....................179/1 HF, 179/100 L, 179/103

[51] Int. Cl.....................H04m 1/00

[58] Field of Search....................179/81 B, 1 HF, 100 D, 100 L, 179/103, 179

[56] References Cited

UNITED STATES PATENTS 2,885,478 5/1959 Cerofolini....................179/1 HF
3,426,160 2/1969 Ring....................179/100 D

*Primary Examiner*—Kathleen H. Claffy
*Assistant Examiner*—William A. Helvestine
*Attorney*—Hane, Baxley & Spiecens

[57] ABSTRACT

Combined loud- and low-speaking telephone instrument in one unit comprising no more than two electro-acoustic converters, one of which is used as a microphone when the telephone instrument is in its loud-speaking function position and as a telephone receiver when the instrument is in its low-speaking function position, while the other electro-acoustic converter is used as a loud-speaker when the telephone instrument is in its loud-speaking function position and as a microphone when the instrument is in its low-speaking function position. When resting on a table or a similar support a switch button which protrudes through the bottom of the telephone instrument is pressed in so as to keep this in its loud-speaking function position, and when the instrument is lifted from its support the switch button is pressed out switching the instrument to its low-speaking function position.

2 Claims, 3 Drawing Figures

INVENTORS
ANDERS KJELL JOHAN CARLSSON
ANDERS OSSIAN JÖRGENSEN
OLOF ALARIK OLSSON
HORST ROBERT ADOLF ZIEGLER
BY Hane, Baxley and Spiecens
ATTORNEYS

INVENTORS

ANDERS KJELL JOHAN CARLSSON
ANDERS OSSIAN JÖRGENSEN
OLOF ALARIK OLSSON
HORST ROBERT ADOLF ZIEGLER

BY Hane, Baxley and Spiecens

ATTORNEYS

COMBINED LOUD- AND LOW-SPEAKING TELEPHONE INSTRUMENT HAVING TWO ACOUSTIC CONVERTERS

In the loud-speaking telephone systems there is always need of instruments having a low-speaking function, dependent on demands for secrecy and on ambient noise. The demand is met by providing the loud-speaking instrument either with a muted telephone receiver to which the incoming speech signal is switched by means of a cradle contact, or with a microtelephone, to which both the incoming and the outgoing speech path are switched. These loud-speaking instruments require, in order to allow a combined loud- and low-speaking function, three and four acoustic converters respectively and a flexible cord for the telephone receiver or the microtelephone.

There are also loud-speaking telephone instruments with a combined function which have only two acoustic converters where the switching from loud-speaking into low-speaking condition is carried out by connecting attenuators in series with the microphone and the telephone receiver. A device of said type is described in the Swedish published application 316,803. These instruments, however, have serious limitations both when used as loud-speaking and when used as low-speaking instruments. The opening of the loud-speaker has to be made so small that it becomes effectively covered by the ear in the low-speaking function. The device used as loud-speaker and telephone receiver respectively should be light in order to make the instrument easy to handle when used as a hand microtelephone. This implies that the frequency range extending downwards of the loud-speaker is limited by the size of the opening of the loud-speaker and that the loud-speaker therewith also gets a low efficiency. Another considerable disadvantage of this proceeding is that if, when the instrument is used as a hand microphone, the switch that connects from low-speaking into loud-speaking position is touched unintentionally, the ear-drum will be exposed to a very heavy sound pressure. For this reason such instruments have suitably a low effective radiated sound power even in the loud-speaking position and are provided with secondary loud-speakers when a stronger sound strength is required.

The purpose of the invention is to provide a telephone instrument in which the above mentioned disadvantages have been eliminated. The device is characterized as is indicated in the characterizing part of the claim.

Figure 1:
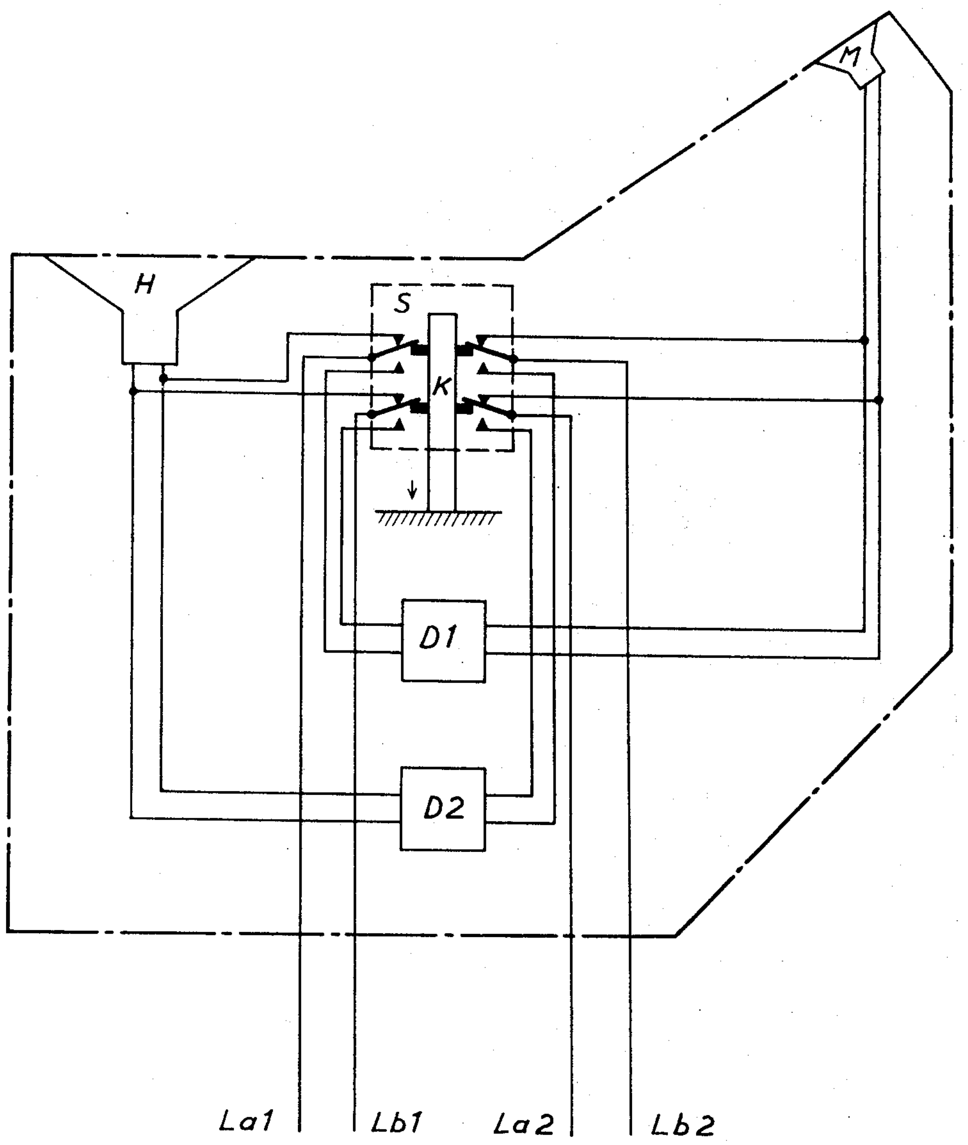
Figure 2:
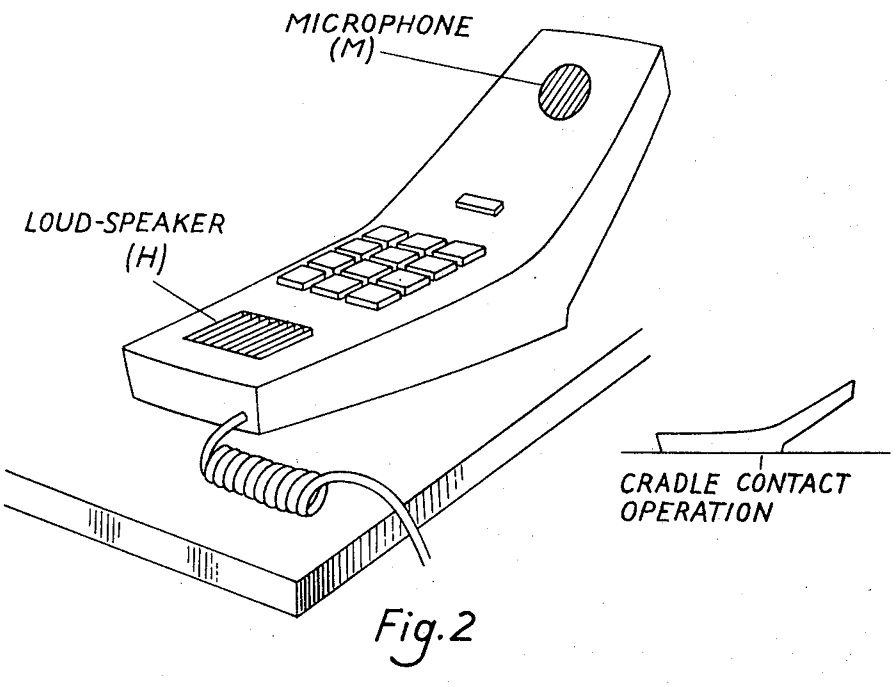
Figure 3:

The invention will be explained here below more closely by means of an embodiment with reference to the enclosed drawing in which FIG. 1 is a circuit diagram of a telephone instrument according to the invention, FIG. 2 is a draft of the telephone instrument in its normal position, resting on a table, and FIG. 3 is a draft showing the telephone instrument used as a low-speaking telephone.

In FIG. 1, by H is designated an electro-acoustic converter of the electrodynamic loud-speaker type, by M is designated an electro-acoustic converter of the electromagnetic microphone type, by S a two-position switch operable by means of a button K which is held resilient in its lower position so as to protrude through the bottom of the telephone instrument when this is lifted from the support. D1 and D2 indicate two attenuators which should be frequency dependent in case diversities in the frequency spectrum of the loud-speaker and the microphone respectively in the frequency spectrum of the microphone and the telephone receiver make a compensation desirable. The incoming and the outgoing pair of conductors respectively of the telephone instrument are designated by *La*1, *Lb*1 and *La*2, *Lb*2.

The telephone instrument is in its normal condition when resting against a support which is mainly horizontal. The button is pressed implying that the incoming pair of conductors ( *La*1, *Lb*1) is connected to the loud-speaker H and the outgoing pair of conductors ( *La*2, *Lb*2) to the microphone M. The instrument functions in this position as a common loud-speaking telephone.

When the instrument is lifted, the incoming pair of conductors is switched over to the microphone via the attenuator D1. The microphone is functioning as a telephone receiver. At the same time the outgoing pair of conductors is switched over to the loud-speaker via the attenuator D2. The loud-speaker is now functioning as a microphone. The necessary level and frequency corrections are carried out in the attenuator. The instrument now functions as a low-speaking telephone.

The telephone instrument can, for example, be designed as it appears from FIG. 2 with two prismatic parts forming an obtuse angle with each other and of which parts one has a plane along which it can rest against a table or a similar support while the other part is extending obliquely upwards form the support. The first part comprises a loud-speaker and a key set while the other part comprises the microphone. The upward part of the instrument is designed in such a way that a natural grip to hold the instrument when used as a low-speaking instrument is obtained as is shown in FIG. 3.

By means of the device according to the invention a telephone instrument has been obtained having a lot of advantages compared with earlier known instruments.

The risk of inconveniences caused by acoustic shocks which can arise upon an unintentional touching of the operating push button has been eliminated.

The opening of the microphone is small so as to achieve a satisfactory screening off when the microphone is used as a telephone receiver.

The loud-speaker can be provided with a strong magnet in order to produce a high power. By placing it in the bottom of the instrument this contributes to make the instrument easy to handle when used as a hand microtelephone. The placing also allows an optimal size of the opening of the loud-speaker.

By the design of the instrument the microphone is directed towards the speaker and is placed relatively high above the surface of the table which is favourable from the sound recording point of view.

We claim:

1. Telephone instrument comprising a first and a second electro-acoustic converter and a switching means for switching the instrument from loud-speaking function into low-speaking function and vice-versa, the first and the second electro-acoustic converter being arranged to be switched upon the operation of the switching means, so that said first electro-acoustic converter in the loud-speaking function of the telephone instrument transforms sound waves into electric signals and in its low-speaking function converts electric signals into sound waves while said second electro-acoustic converter in the loud-speaking function of the telephone instrument converts electric signals into sound waves and in its low-speaking function converts sound waves into electric signals.

2. Telephone instrument according to claim 1, comprising further two attenuators for producing necessary level and frequency corrections, said attenuators being connected individually between the electro-acoustic converters and the connection wire of the telephone instrument by means of said switching means when this is switched into the position corresponding to the low-speaking function of the telephone instrument.

* * * * *